April 15, 1958　　R. L. CHANDLER ET AL　　2,830,519
TWO-WAY PLOW
Filed April 19, 1954　　　　　　　　　　4 Sheets-Sheet 1
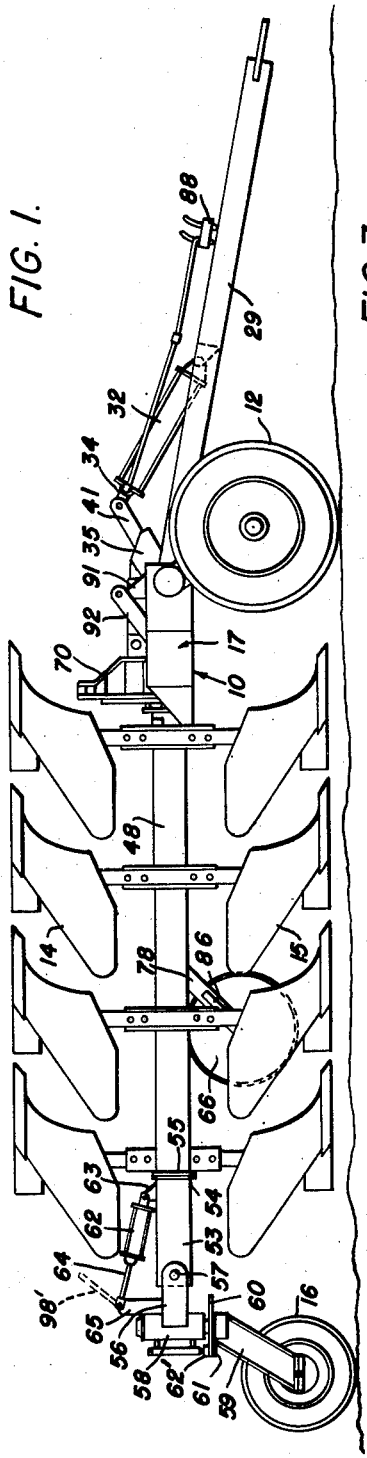
ROY L. CHANDLER,
CLAUDE B. OGLE, JR.,　　INVENTORS.
BY
Attorney

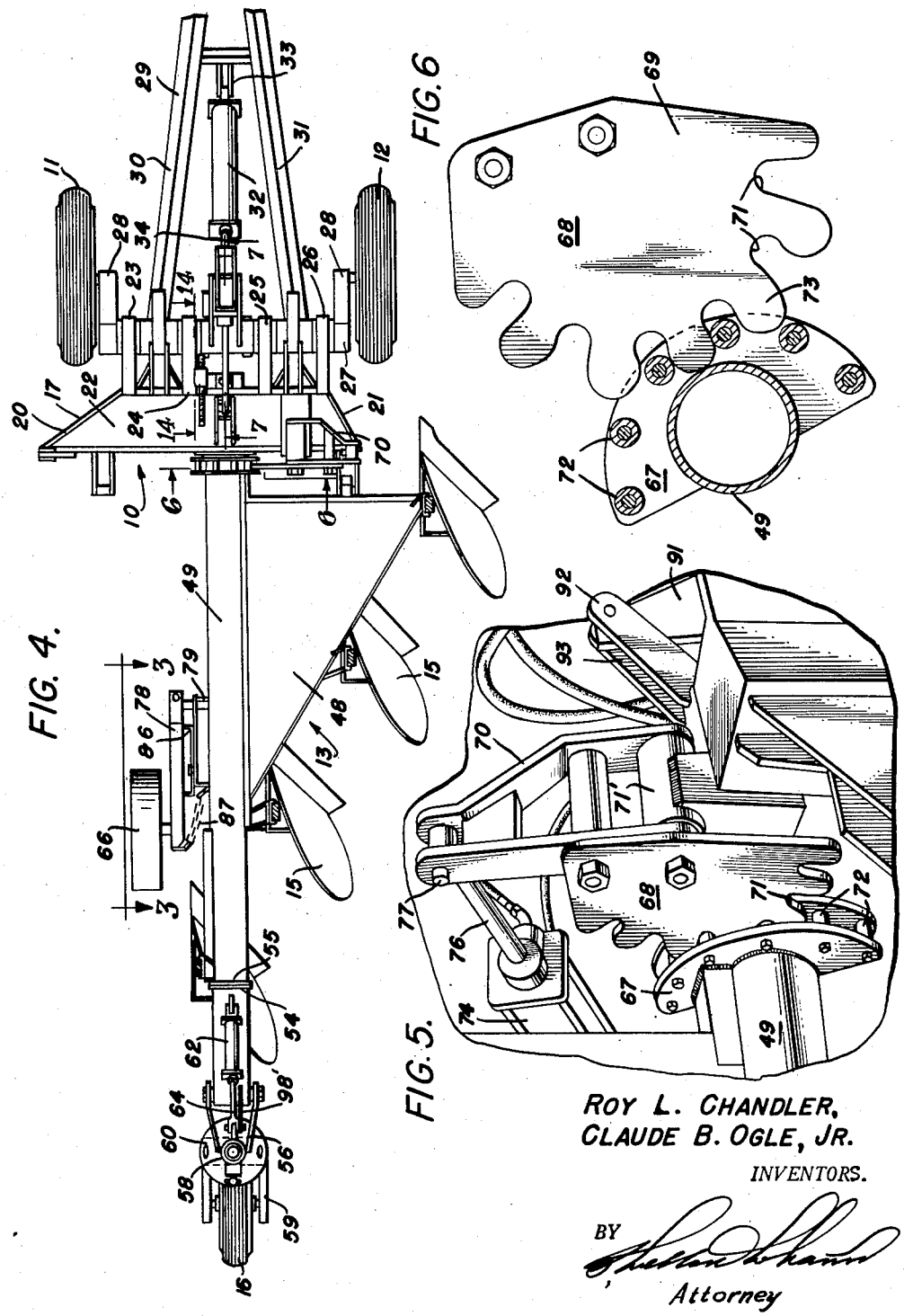

April 15, 1958  R. L. CHANDLER ET AL  2,830,519
TWO-WAY PLOW
Filed April 19, 1954  4 Sheets-Sheet 3

ROY L. CHANDLER,
CLAUDE B. OGLE, JR.,
INVENTORS.

BY
Attorney

April 15, 1958     R. L. CHANDLER ET AL     2,830,519
TWO-WAY PLOW

Filed April 19, 1954     4 Sheets-Sheet 4

ROY L. CHANDLER,
CLAUDE B. OGLE, JR.,
INVENTORS.

BY
*Attorney*

United States Patent Office 2,830,519
Patented Apr. 15, 1958

2,830,519

TWO-WAY PLOW

Roy L. Chandler, Bell, and Claude B. Ogle, Jr., Pasadena, Calif., assignors to Atlas Scraper and Engineering Co., Bell, Calif., a corporation of California Application April 19, 1954, Serial No. 424,108

12 Claims. (Cl. 97—46.27)

The present invention relates generally to earth working equipment, and is more particularly concerned with a two-way plow in which right-hand and left-hand plowing elements are arranged for selective movement into plowing positions.

It is one object of the herein described invention to provide a two-way plow of the roll-over type in which the plow gangs are offset on a roll-over frame with respect to the central axis of a wheeled carrier frame structure, wherein front wheels of the carrier travel on unplowed ground, thus eliminating the need for any transverse levelling adjustment, and permitting full depth plowing with all the plow bottoms on the first run; and in which the carrier front wheels and an associated gauge wheel travel on unplowed ground, thus enabling complete gauging of the plowing depth from the surface of the unplowed ground; and which provides greater ground clearance for roll-over in changing from one plowing position to another.

It is a further object to provide an improved two-way plow having a wheeled carrier so arranged that the carrier front wheels travel on unplowed ground in relatively smooth and stubble free tracks, when using a track type towing tractor, thus minimizing roughness and damage to pneumatic tires which may be used on the carrier front wheels.

A further object is to provide improved means in a two-way plow for actuating the roll-over frame, wherein it becomes unnecessary to provide latching means for retaining the roll-over frame against roll-back, thus enabling the plow bottoms to heel over slightly for quick penetration upon starting the plowing operation, yet prevent roll-back of the roll-over frame while plowing; which provides a variable transmission; and which also acts to actuate a power operating means with retarding effect.

Another object is to provide a two-way plow in which the towing tractor will normally run on unplowed ground, thus simplifying the construction by the elimination of mechanism such as conventionally employed in plows of this type for laterally shifting the tongue of the carrier frame.

A further object is to provide an improved two-way plow of the above type in which the carrier frame is pulled by a tongue pivoted for vertical swinging movements, and supported on a wheeled structure arranged for adjusting movements to raise and lower the carrier frame by power means interconnected between the tongue and wheel structure, in which various types of power means may be utilized, and in which the power means will also function as a power lift for the tongue to aid and facilitate hitching the plow to a tractor.

A further object is to provide a two-way plow having a wheeled carriage in which the wheels may be adjusted simultaneously, thus keeping the plow leveled while lifting; and further permitting the front plow bottom to be lifted before the rear plow bottom so as to "plow out" of the plowing position when lifting and thus reduce the load on the plow frame structure.

A further object is to provide a two-way plow in which the plowing elements are supported from a wheeled carrier frame structure arranged to be raised and lowered at its forward end by actuation of adjustable front wheels, and at its rear-end by a delayed cantilevering action or by delayed lifting means associated with a castering wheel.

Another object is to provide a two-way plow which is supported on non-guiding front wheels operable to raise and lower the front end of the plow, and a castering rear wheel, the wheels being available for transporting the plow, and wherein safety latches hold the wheels in plow raised position during the transporting operation.

Another object is to provide in a two-way plow, which is supported on a carrier frame having a vertically swingable tongue and adjustable front wheels by which the carrier frame may be raised and lowered; unique fluid operable floating lift means interposed between the tongue and wheel adjusting means, whereby vertical movements of a pulling tractor will not be transmitted to the plowing elements; and cantilever action on the plow eliminated.

A further object is to provide in plows of the herein described type, improved fluid piston and cylinder actuated lift means between the tongue and carrier wheels, wherein under predetermined conditions fluid is permitted to flow from one end of the cylinder to the other so as to prevent a tendency of upward movement of the tongue to lift the front end of the plow.

Still another object is to provide in a two-way plow having plow bottoms on an offset roll-over frame structure, unique means for actuating the roll-over frame, wherein a greater mechanical advantage is obtained at the start of the rolling action to overcome the inertia and unbalanced load of the offset structure, and in which the mechanical advantage decreases through the mid-portions of the rolling action where the load is more nearly balanced, and in which greater mechanical advantage is again obtained during the final portion of the rolling action, thus making it possible to accomplish the rolling action with minimum power, free of final impact, and without the necessity of having to resort to the use of expensive and complicated counterweights or spring arrangements.

It is also an object to provide in a two-way plow of the herein type, a carrier frame construction which is so arranged that the plowing elements and their associated frame parts may be readily removed, and replaced by a supporting bar for other types of earth working tools.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a side elevational view of a two-way plow embodying the features of the present invention;

Fig. 2 is an enlarged fragmentary perspective view showing details of the power actuating devices and associated parts for operating the plow;

Fig. 3 is an enlarged side elevational fragmentary view showing the details of the plowing depth gauging wheel; as viewed along the line 3—3 of Fig. 4;

Fig. 4 is a plan view of the plow shown in Fig. 1;

Fig. 5 is an enlarged fragmentary perspective view illustrating the details of the power actuating means for turning the roll-over frame for selectively bringing the plowing elements into operative position;

Fig. 6 is an enlarged fragmentary sectional view showing parts of the power transmitting means for turning the roll-over frame, taken substantially on line 6—6 of Fig. 4;

Figure 8:
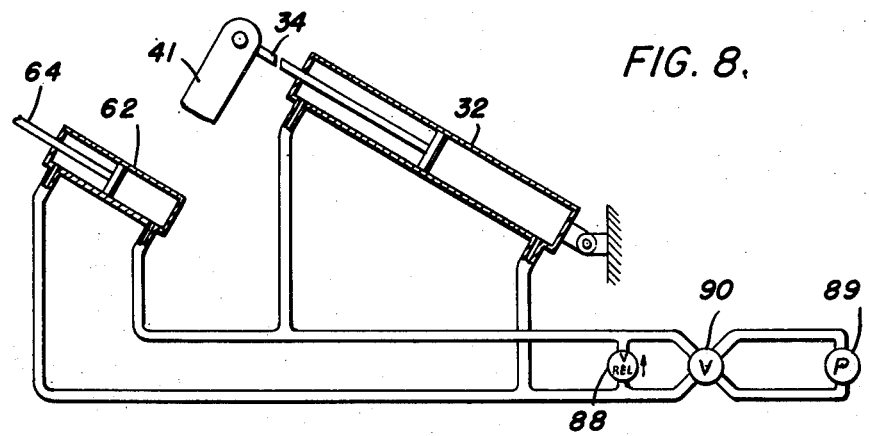
Fig. 8 is a view diagrammatically illustrating the interconnection between fluid cylinder actuators for raising and lowering the front and rear-ends of the plow assembly.

Referring more specifically to the drawings, the plow assembly is arranged to be towed behind a powered vehicle such as a tractor. In general, the plow assembly includes a mobile carrier frame 10 supported upon wheels 11 and 12. Extending rearwardly of the carrier frame 10 is a roll-over frame 13 which carries a left-hand plow gang 14 and a right-hand plow gang 15. The rearmost end of the plow assembly is provided with a caster wheel 16 which cooperates with the wheels 11 and 12 to form a three point support for the plows, and are also utilized for controlling the plow operations as well as for transporting the plow from one location to another.

Figure 14:
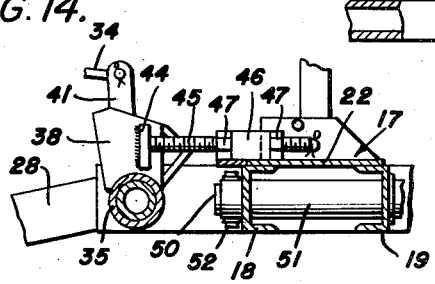
Fig. 14 is a fragmentary detail view partly in section to show the construction of the depth adjusting screw, taken substantially on line 14—14 of Fig. 4.

Considering the plow assembly more specifically, the carrier frame comprises a transversely extending box frame 17 composed of a forward channel 18 and a spaced rear channel 19, as shown in Fig. 14, these channels being connected at their ends by end members 20 and 21, and bridged by a top plate 22.

A plurality of forwardly extending bracket members 23, 24, 25 and 26 are secured at their rear-ends to the box frame 17 in spaced apart relation, and at their outermost ends form bearing supports for a rotatable shaft or axle structure 27. This shaft structure at its opposite ends is provided with a projecting arm 28 in each case which supports the wheel 11 or wheel 12 for rotation about an axis offset with respect to the shaft structure 27.

A tongue structure 29 includes rearwardly diverging side rails 30 and 31, the side rail 30 being pivoted at its rear-end on the shaft structure 27 between bracket members 23 and 24, while the side rail 31 is pivoted at its rear-end on the shaft structure 27 between the bracket members 25 and 26. The tongue is thus supported for vertical swinging movements about its rear-end.

The structure as thus far described provides an arrangement by means of which the rear-end of the tongue 29 and carrier frame may be raised and lowered in response to rotative movements of the shaft structure 27. This is accomplished by the provision of power means which are interconnected between the shaft structure and the tongue 29. By activation of the power means, the tongue 29 may be raised and lowered, when the shaft structure is retained against raising and lowering movements. Thus the coupling operation of the tongue to a towing tractor is greatly facilitated by use of the power means.

More specifically, the power means comprises a power lifting device which may be a single cable operable by the tractor, or as disclosed in the present case a fluid cylinder 32 having a pivoted anchor connection 33 at one end with the tongue 29. A power delivery element 34 is operatively associated with the fluid cylinder and connected with the shaft structure 27 through a lost motion connection.

Figure 7:
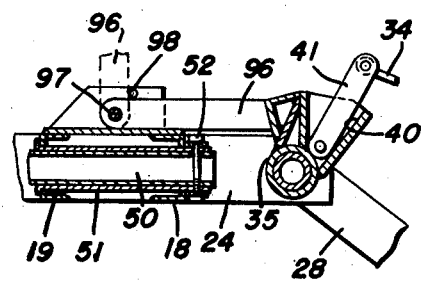
Fig. 7 is a fragmentary sectional view showing details of the lost motion connection for raising and lowering the carrier frame, taken substantially on line 7—7 of Fig. 4.

As most clearly shown in Figs. 2 and 7, the lost motion connection comprises a coupler 35 fabricated from plate members which are welded or otherwise secured together to form a projecting arm structure rotatable with the shaft structure. As shown, the coupler includes a back plate 36, a front plate 37 and side plates 38 and 39 which cooperate in assembled relation to form in effect a socket 40. A floating link 41 is arranged with one end positioned within the socket 40, this end being pivoted on a pivot pin 42 supported by the side plates 38 and 39, thus enabling limited angular movement of the link 41 between the back plate 36 and front plate 37. The free end of the floating link 41 is connected with the power delivery element 34.

Movement of the coupler 35 in a clockwise direction for raising the rear-end of the tongue with respect to the wheels 11 and 12 is limited by an abutment stop member 43 on the tongue structure, as shown in Fig. 2. Movement of the coupler 35 in an opposite direction is normally limited by engagement of a projection 44 on the side plate 38 with one end of an abutment screw 45 which is longitudinally adjustable within a support 46 mounted on the box frame 17 of the carrier frame, lock nuts 47 being provided for retaining the abutment screw in adjusted position. The abutment screw is utilized for determining plowing depth in a manner hereinafter to be more fully described.

The carrier frame in its broad concept is susceptible of use with various types of earth working tools, but for purposes of illustration has been disclosed herein as being associated with the left-hand gang and right-hand gang of a two-way plow arrangement. The plow gangs are shown primarly in Fig. 4 as being supported on the roll-over frame 13 which embodies a triangular box-like platform 48 which is secured along one edge to a tubular member 49 rotatably supported upon a hollow stationary tube 50 for roll-over movement about the longitudinal axis of the tube. The tube 50 is supported at one end within a tubular sleeve 51 forming a part of the box frame 17 and secured as by welding or other conventional means to the channel members 18 and 19. The tubular sleeve 51 is positioned centrally between the wheels 11 and 12, and so that the stationary tube 50 will project rearwardly and be in axial alignment with the longitudinal axis of the tongue 29. The tube 50 is fixedly secured by a securing bolt 52 passing through aligned openings in the tubular sleeve 51 and tube 50. Thus, the tube 50 is removably mounted in the sleeve 51.

In the plow assembly as shown in Fig. 1 the roll-over frame 13 is retained against axial movement on the stationary tube 50 by a thrust sleeve 53 at the rear-end of the tube 50, the thrust sleeve and tubular member 49 having cooperatively associated thrust flanges 54 and 55.

Associated with this end of the plow assembly, there is provided a swingably mounted bearing bracket 56, this bracket being pivoted for vertical swinging movement about a pivot pin 57 which also functions to secure the thrust sleeve 53 to the associated end of the stationary tube 50. This bracket has mounted therewith a bearing 58 which rotatably supports a fork 59 on which the caster wheel 16 is mounted. At the upper end of the fork 59 is a disc 60 which is provided with a dwell point 61 in its periphery for receiving a spring actuated detent roller 62' therein, when the caster wheel is in a trailing position. This detent tends to stabilize the caster wheel and prevent flutter when trailing.

The rear-end of the plow assembly is thus arranged so that it may be raised and lowered with respect to the caster wheel 16, by swinging the bearing bracket 56 about the pivot pin 57 by means of a suitable actuator. For such purpose, there is provided a second fluid cylinder 62 which is anchored at one end to a lug 63 carried by the thrust sleeve 53. The fluid cylinder has operatively associated with it a power delivering element 64 having its outer end pivotally connected to a projecting arm 65 of the bearing bracket 56. With the power delivery element fully extended, the associated end of the plow assembly will be raised with respect to the caster wheel 16, and with the power delivery element 64 retracted, the associated end of the power assembly will be in a lowered position with respect to the caster wheel.

As clearly shown in Fig. 4, a plow gang, in this instance the right-hand gang, comprises four individual plow elements or bottoms which are secured to the roll-over frame so that the gang as a unit is offset with respect to the turning axis of the roll-over frame. With the offset arrangement, it will be observed that the innermost plow bottom is directly below the turning axis, when the gang is in operating position, and that the outermost plow bottom is positioned at least a distance from the roll-over axis as great as the path of movement of the wheel 12. By offsetting the plow gangs in this manner, and with the turning axis of the roll-over frame aligned with the mid-axis between the wheels 11 and 12, and the longitudinal axis of the tongue 29, the tractor and wheels 11 and 12 as well as a depth gauging wheel 66 are all permitted to run on unplowed ground. A definite reference plane is thus established for the plowing operation, and it is not necessary to provide horizontal tongue shifting devices as in many of the conventional arrangements in plows of this type, where one of the wheels for the carrier frame must operate in a previously plowed furrow.

Heretofore, it has been the customary practice to mount the plow gang as nearly symmetrically as possible with reference to the turning axis of the roll-over frame, in order that the size of the power actuating means for turning the roll-over frame might be kept within practical limits of size. Utilization of an offset plow gang sufficiently to permit running on unplowed ground is made practical by utilization of unique means for actuating the roll-over frame, wherein a greater mechanical advantage is obtained at the start of the rolling action to overcome the inertia and unbalanced load of the offset structure, and in which the mechanical advantage decreases through the mid-portion of the rolling action where the load is more nearly balanced, the greater mechanical advantage again coming into play during the final portion of the rolling action. With such an arrangement, it is possible to accomplish the rolling action with minimum power, free of final impact, and without the necessity of having to resort to the use of expensive and complicated counterweights, springs, etc.

As shown in Figs. 5 and 6, the tubular member 49 is fitted adjacent its forward end with a sector pin gear 67 having operative relationship with a driving member 68.

The driving member 68 comprises a flat plate 69 which is secured to a turning bracket 70 supported at one end in a bearing 71' on the box frame 17. The outer edge of the plate 69 is provided with spaced indentations 71 which extend generally in a radial direction from the rotational axis of the plate 69 and open outwardly for driving cooperation with pin supported rollers 72 in spaced apart relation adjacent the peripheral edge of the sector gear 67. The spacing between the indentations 71 defines spaced projection lobes 73 adapted to successively extend between the rollers 72 during driving operation. These lobes are effective to restrain movement of the roll-over frame by virtue of its center of gravity being offset with reference to its turning axis.

Actuation of the driving member 68 is accomplished by means of a fluid cylinder 74 extending transversely with respect to the axis of rotation of the roll-over frame, and having one end anchored to a bracket 75 carried by the box frame 17. Associated with a cylinder 74 is a power delivery element 76 which is connected to the outer end of the turning bracket 70 by means of a connection pin 77.

By reference to Fig. 6, it will be observed that the endmost rollers 72 are positioned a greater distance from the center of the tubular member 49 than the rollers at the mid-position of the sector gear. Correspondingly, the bottoms of the endmost indentations on the plate 69 are closer to the axis of rotation of the driving member than the intermediate indentations. It is believed that it will therefore be evident that by automatically changing the mechanical advantage so that it is greatest at the plowing positions of the gangs, it is possible to utilize a substantially constant force to actuate the roll-over frame against the greater opposing force due to the offset construction, and thus keep the power means within practical size limits. With the actuating mechanism just described, an added advantage is obtained in that the speed of roll-over is reduced during the periods when the overhang or offset forces are in greatest opposition to the power means.

The plowing depth is determined by the cooperative action of the abutment screw 45 and the depth gauging wheel 66. As shown in Figs. 3 and 4 the depth gauging wheel 66 is supported at the outermost end of an arm 78 which is pivotally supported at its innermost end on a bracket 79 secured to the tubular member 49 of the roll-over frame. The pivot support for the arm 78 provides swinging movement of the arm about a pivot member 80 and about a pivot 81, these pivots being in right angle relation. Adjacent the innermost end of the arm 78, a plate 82 is supported on the bracket 79, this plate having a plurality of openings 83 therein for the reception of abutment pins 84 and 85 which are adapted to make engagement with a stirrup 86 on the back side of the arm 78.

Figure 11:
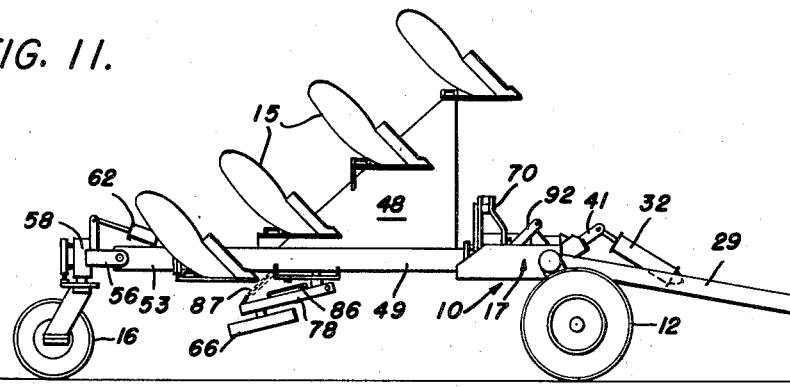
Fig. 11 is a side elevational view showing the plow gangs in elevated position for transport of the equipment.

Briefly the operation of the gauging wheel 66 is as follows: Assuming that the right-hand plow gang 15 is in operating position as shown in Fig. 4 and it is desired to turn the roll-over frames so as to bring the left-hand gang into operative position, the weight of the wheel 66 will cause the arm 78 to pivot about the pivot 81 until it is limited by a restraining chain 87. As the roll-over frame passes an upwardly extending central position directly over the turning axis of the frame, as shown in Fig. 11, the arm 78 will swing about its pivot 80 until the arm angularly extends on the opposite side of the plate 82. As the left-hand gang now comes into a plowing position, the weight of the wheel 66 causes the arm 78 to again swing about its pivot 81 in a direction to bring the stirrup towards the plate 82 so that as the plow gang enters the ground, the stirrup will engage the abutment pin 84 and thus limit the plowing depth of the gang. By adjusting the positions of the pins 84 and 85, and the position of the abutment screw 45, the position of the carrier frame and the roll-over frame can be properly adjusted for a desired plowing operation.

Referring now to Fig. 8, the fluid cylinder 32 and fluid cylinder 62 are so designed that their relative unit loading is such that the latter will be operated with a delayed action with respect to the operation of the former. That is, if the cylinder 32 is about six inches in diameter and the diameter of the cylinder 62 is made three to four inches in diameter the proper unit loading will result, and the operation of the power delivering element associated with cylinder 62 will be delayed until after completion of the operation of the power delivery element associated with cylinder 32. This delayed action is particularly advantageous in causing the individual plowing elements to enter and leave the ground. For example, let it be assumed that the plow is in the position shown in Fig. 1 and it is desired to begin the plowing operation.

Figure 9:
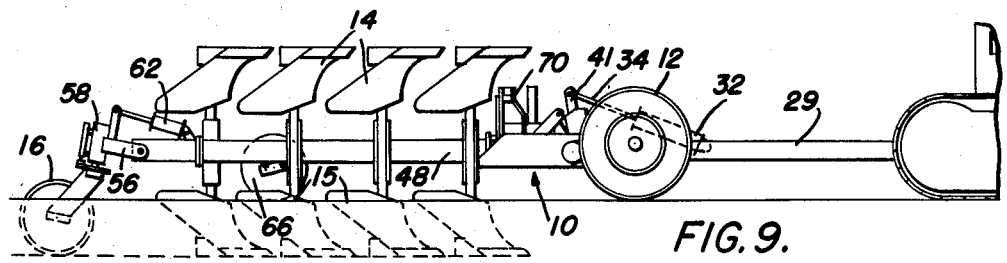
Fig. 9 is an elevational view diagrammaitcally illustrating the plow with one of the plow gangs in operative plowing position.

Fluid is admitted to the cylinder 32 which operates to lower the carrier frame 10, and since the cylinder 62 operates with a delayed action, the lowering of the carrier frame 10 causes the individual plow elements to tilt their points downwardly so as to enter the earth and heel over slightly toward the land sides in a similar manner to the walking type plow. This results in easier penetration of the soil, and as the plowing depth is reached, as determined by the setting of the abutment screw 45, further lowering of the carrier frame will be concluded and the cylinder 32 will have completed its operation. This will permit the pressure to be built up in cylinder 62 and now actuate the power delivering element 64 to retract and lower the back end of the roll-over frame until the gauging wheel 66 limits the downward movement at the predetermined correct plowing position desired, as shown in Fig. 9.

Figure 10:
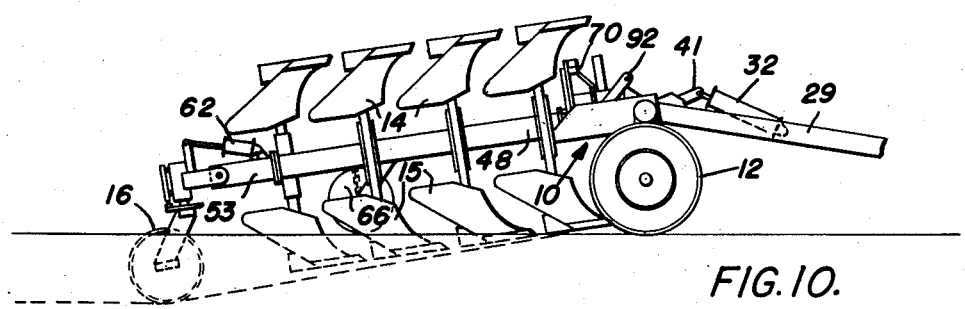
Fig. 10 is a similar view showing the front end of the plow assembly raised so that the plowing elements will be tilted up and cause the plow to "plow itself out" from the plowing position.

When it is now desired to terminate the plowing operation, the cylinder 32 is first energized and acts to raise the carrier frame 10, thus causing the points of the individual plowing elements to tilt upwardly. This action breaks the suction of the bottoms and the forward motion of the tractor pulls the plows upwardly and out of the soil with a minimum of strain on the plowing elements. The delayed action of the cylinder 62 then operates to raise the rear-end of the roll-over frame after the plowing elements have been substantially withdrawn from the soil, as diagrammatically illustrated in Fig. 10.

As a further feature of the power system, as illustrated in Fig. 8, a relief valve 88 is connected as shown so as to open under preset pressure conditions and pass operating fluid from the anchored end of the cylinder 32 to its opposite end under certain operating conditions which will be now explained. Fluid for operation of the power cylinders is supplied from a suitable pump 89 and is controlled by a control valve 90, both the pump and valve being mounted on the tractor equipment.

Under normal operating conditions, the floating link 41 is freely swingable within the limits of the socket 40. The lost motion connection thus provided prevents normal raising and lowering movements of the tongue due to the tractor travelling over uneven ground from being transmitted to the plow assembly, and eliminates the possibility of subjecting the equipment to abnormal stresses.

In the event that an abnormal downward movement of the tongue should occur of such amount as to cause the floating link 41 to engage the front plate 37 of the coupler 35, continued movement of the tongue would operate to move the coupler forwardly until it engaged the abutment stop member 43 on the tongue. This movement, it will be observed acts to raise the carrier frame slightly. Since the carrier frame is pivoted on the shaft structure, the carrier frame is free to accommodate itself to the raised position without placing additional strain on the plow supporting structure, and the slight raising of the carrier frame will cause the individual plow elements to tilt upwardly and tend to relieve the plowing forces on the plowing elements.

On the other hand, if the raising movement of the tongue is excessive and of an amount which would cause the floating link 41 to engage the back plate 36, which is normally against the abutment screw 45 during the plowing operation, the fluid pressure in the cylinder 32 at its lower end will be increased and unless relieved would permit upward movement of the tongue to raise the wheels 11 and 12 and thus place undue strain on the plow assembly. Under such conditions, the relief valve 88 opens and permits bypassing of fluid from the lowermost end of the cylinder 32 to the uppermost end, thus preventing the transfer of excessive upward movement of the tongue to the coupler.

Figure 12:
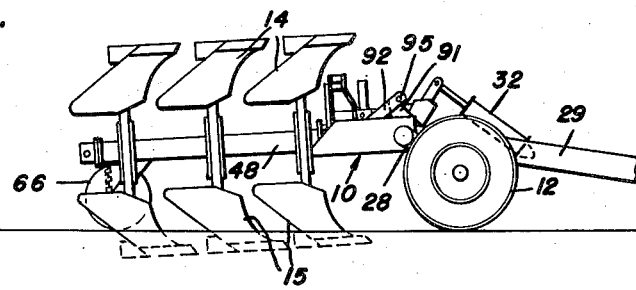
Fig. 12 is a side elevational view of a modified construction according to the present invention, the forward end of the plow assembly being raised so as to cause the plow to "plow itself out"
Figure 13:
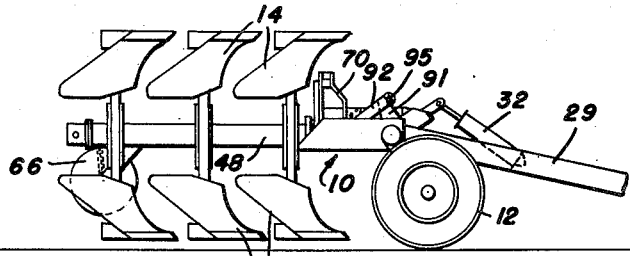
Fig. 13 is a side elevational view of the plow shown in Fig. 12, the plow gangs having been raised through cantilever action until the active gang has been raised sufficiently to clear the ground.

As shown in Figs. 12 and 13, the number of plowing elements in the plow gangs may be reduced in number. For example, when three plowing elements are used in each gang, the caster wheel 16 and its associated parts may be eliminated and the roll-over frame supported upon the tube 50 as a cantilever support rather than a beam member supported at its outer end by the caster wheel assembly.

In using this modified construction, a floating interconnection is made between the carrier frame 10 and the tongue 29 in order to limit pivotal movement of the carrier frame on the shaft structure under the action of cantilever forces. As best shown in Fig. 2, the tongue side rails 30 and 31 are each provided at their pivot end with an angularly extending arm 91 adapted to swing with movements of the tongue. The outer end of this arm is positioned between spaced fixed arms 92 and 93 secured to and angularly projecting from the box frame 17. The outermost ends of the arms 92 and 93 are provided with aligned openings 94 which are adapted to receive a pin 95, as shown in Fig. 12, which serves as an abutment for the arm 91 when relatively swung in a clockwise direction as viewed in Fig. 2.

During a normal plowing operation, the arm 91 is freely movable between the fixed arms 92 and 93 and is inactive with respect to normal swinging movements of the tongue. At the conclusion of a plowing operation, the raising movement of the carrier frame causes the plow elements to tip upwardly and plow their way out in a similar manner to that explained in the plow assembly utilizing the caster wheel 16. This initial position is shown in Fig. 12. As the plowing elements move out of the soil, the load on the lifting mechanism is materially reduced, and as raising movement of the carrier frame is continued, a point is reached at which the arm 91 strikes the pin 95. A delayed cantilevering action of the roll-over frame now takes place and the rear-end of the roll-over frame is raised until the roll-over frame is in a substantially level position for enabling the roll-over operation.

In the plow assembly of Fig. 1, the wheels 11 and 12 cooperate with the caster wheel 16 to form a three point support during transportation of the plow assembly from one location to another. With this form of the invention, the wheel assemblies are latched in raised frame position so as to relieve the power cylinders of load forces during transportation of the equipment. In the case of the wheels 11 and 12, a latching link 96 is supported on the box frame 17 for swinging movement about a pivot pin 97 at one end. The latching link is arranged to be swung into a position, as shown in full lines in Fig. 7 wherein it engages back of the coupler 35 and thus holds the frame in raised position relative to the wheels 11 and 12. The latch, when not used may be moved to the dotted line position. The latch may be held in either of these positions by means of a retaining pin 98 or other suitable means incorporated in the support or adjacent structure.

In the case of the caster wheel 16, a latching link 98' is pivoted at one end on the projecting arm 65 so that its free end may be swung to a position for engagement with the end of the fluid cylinder 62 structure, in which position the latching link retains the power delivering element 64 in extended position corresponding with that of the raised position of the adjacent roll-over frame structure. When not in use, the link 98' may be swung to a non-effective position.

In the case of the plow assembly shown in Figs. 12 and 13, the latching link 96 is the only one utilized, since in this modification there is no caster wheel.

Figure 15:
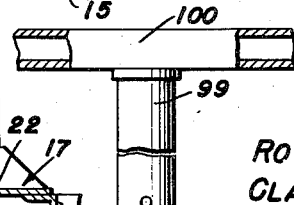
Fig. 15 is a fragmentary view of a tool carrier which may be substituted for the support utilized for the roll-over frame, to permit utilization of earth working tools other than the deep tillage plow bottoms.

While the plow assembly of the present invention has been described primarily as a two-way plow assembly, the construction of the carrier frame, and the raising and lowering mechanism associated and connected between the tongue and wheel suspension, makes this portion of the plow assembly admirably fitted for utilization as a carrier generally for different types of earth working tools. For this reason, the stationary tube 50, as previously explained, is removably secured within the tubular sleeve 51. By simply removing the tube 50, the tubular sleeve 51 may then be utilized for supporting other types of tool carriers. As one example of such a tool carrier, there has been illustrated in Fig. 15 a tool carrier which comprises a tubular member 99 which is adapted to be inserted into the tubular sleeve 51 and secured by bolt 52 in the same manner as in the case of the stationary tube 50. At its rear-end, the tubular member is provided with a cross bar 100 which is adapted to extend transversely behind the carrier frame and serve as a mount for different conventional earth working tools.

Various modifications may suggest themselves to those skilled in the art without departing from the spirit of our invention, and hence, we do not wish to be restricted to the specific form or forms shown or uses mentioned, except to the extent indicated in the appended claims.

We claim:

1. Earth working equipment, comprising: a tongue; a pivot structure having a shaft supporting said tongue for vertical swinging movements and carrying a pair of laterally spaced ground-contacting wheels; means for raising and lowering said pivot structure with respect to said wheels including a power actuator connected between said shaft and said tongue; and a frame adapted to support an earth working tool, said frame having a support connection with said tongue independent of said power actuator so as to be raised and lowered simultaneously with said pivot structure to change the positions of said frame and tool associated therewith.

2. Earth working equipment, comprising: a tool carrier frame; a pair of laterally spaced ground-contacting wheels carried by said frame; a vertically swingable tongue having a pivot connection at its rear-end with said frame; and a power transmitting connection between said tongue and wheels adapted to raise and lower said frame with respect to said wheels, when the forward end of said tongue is restrained against vertical movement, and to swingably raise and lower the forward end of said tongue, when said frame is restrained against movement with respect to said wheels.

3. Earth working equipment, comprising: a tongue; an axle supporting said tongue for vertical swinging movements about its rear-end; a ground-contacting wheel at each end of said axle supported with its axis of rotation offset with respect to said axle; means connected between said tongue and said axle operable to rotate said axle and swing said wheels to raise and lower the rear-end of said tongue; and a carrier frame including an elongate tool supporting member positioned rearwardly of said axle, said carrier frame having a pivotal connection with said axle independent of said means, whereby said member is raised and lowered with said axle.

4. Earth working equipment, comprising: a tongue; an axle supporting said tongue for vertical swinging movements about its rear-end; a ground-contacting wheel at each end of said axle supported with its axis of rotation offset with respect to said axle; power means connected between said tongue and said axle, said means including a lost motion connection and being operable to rotate said axle and swing said wheels to raise and lower the rear-end of said tongue; and a member adapted to carry an earth working tool, said member being positioned rearwardly of said axle and connected for raising and lowering movements with the rear-end of said tongue.

5. Earth working equipment, comprising: a tongue; an axle supporting said tongue for vertical swinging movements about its rear-end; a ground-contacting wheel at each end of said axle supported with its axis of rotation offset with respect to said axle; means connected between said tongue and said axle operable to rotate said axle and swing said wheels to raise and lower the rear-end of said tongue; a tool carrier frame pivoted on said axle and including a rearwardly extending member supported at one end so as to form a cantilever tool support; and manually selectable stop means limiting relative pivoted movement between said tongue and said carrier frame.

6. Earth working equipment, comprising: a tongue; an axle supporting said tongue for vertical swinging movements about its rear-end; a ground-contacting wheel at each end of said axle supported with its axis of rotation offset with respect to said axle; means connected between said tongue and said axle operable to rotate said axle and swing said wheels to raise and lower the rear-end of said tongue; a tool carrier frame pivoted on said axle and including a rearwardly extending member supported at one end so as to form a cantilever tool support; an abutment stop member carried by said tongue; and a carrier frame portion adapted to engage said stop and limit pivotal movement of said carrier frame in a direction which would lower the outer end of said rearwardly extending member.

7. Earth working equipment, comprising: a tongue; an axle supporting said tongue for vertical swinging movements about its rear-end; laterally spaced ground-contacting wheels carried by said axle, and having their axes of rotation offset with respect to said axle; a carrier frame including a rearwardly extending elongate member adapted to support a plowing element; power means for rotating said axle to raise and lower said frame and the associated end of said member; a gauging wheel carried by said member for determining plowing depth when said frame and member are lowered to a plowing position; and a lost motion connection between said tongue and frame arranged to operate with a delayed action and raise said member in its entirety with a cantilever action as the raising movement is continued from an initial first movement of said frame, said initial movement acting to raise the forward end of said member and tilt the plowing element upwardly so that it will plow itself out of the ground from the plowing position.

8. Earth working equipment, comprising: a carrier frame including a support for an earth working tool; an axle supported on said frame for rotational movement; laterally spaced ground-contacting wheels carried by said axle, and having their axes of rotation offset with respect to said axle; a tongue pivoted at its rear-end on said axle for vertical swinging movements; power means connected between said tongue and axle for rotating said axle to raise and lower said frame; stop means for limiting the rotation of said axle in a direction to lower said frame; and means for adjusting said stop to determine the lowered position of said frame and consequent working position of the earth working tool.

9. Earth working equipment, comprising: a carrier frame including a support for an earth working tool; an axle supported on said frame for rotational movement; laterally spaced ground-contacting wheels carried by said axle, and having their axes of rotation offset with respect to said axle; a tongue pivoted at its rear-end on said axle for vertical swinging movements; power means connected between said tongue and axle for rotating said axle to raise and lower said frame; stop means carried by said tongue for limiting rotation of said axle in a direction for raising said frame; and stop means carried by said frame for limiting rotation of said axle in a direction for lowering said frame, said latter stop means being adjustable to vary the lowered position of said frame and the consequent working position of the earth working tool.

10. Earth working equipment, comprising: a carrier frame including a support for an earth working tool; an axle supported on said frame for rotational movement; laterally spaced ground-contacting wheels carried by said axle, and having their axes of rotation offset with respect to said axle; a tongue pivoted at its rear-end on said axle for vertical swinging movements; power means connected between said tongue and axle for rotating said axle to raise and lower said frame; stop means carried by said tongue for limiting the rotation of said axle in a direction for raising said frame; stop means carried by said frame for limiting rotation of said axle in a direction for lowering said frame, said latter stop means being adjustable to vary the lowered position of said frame and the consequent working position of the earth working tool; and an adjustable gauging wheel carried by said tool support cooperating with the adjustable stop means for determining the working position of said earth working tool.

11. Earth working equipment, comprising: a carrier frame including a support for an earth working tool; an axle supported on said frame for rotational movement; laterally spaced ground-contacting wheels carried by said axle, and having their axes of rotation offset with respect to said axle; a tongue pivoted at its rear-end on said axle for vertical swinging movements; an actuating connection including power means between said tongue and axle for rotating said axle to raise and lower said frame; stop means for limiting the rotation of said axle at points respectively determining the raised and lowered positions of said frame; and lost motion means in said power actuated connection enabling independent limited swinging movements of said tongue when said tool engages the earth surface, and when the frame is in lowered position as determined by said stop means.

12. Earth working equipment, comprising: a carrier frame including a support for an earth working tool; an axle supported on said frame for rotational movement; laterally spaced ground-contacting wheels carried by said axle and having their axes of rotation offset with respect to said axle; a tongue pivoted at its rear-end on said axle for vertical swinging movements; stop means for limiting the rotation of said axle at points respectively determining the raised and lowered limits of said frame; a power actuated connection between said tongue and axle for rotating said axle between said limits, and including a fluid power cylinder; and a pressure relief fluid bypass between the ends of said cylinder operative to permit raising movement of said tongue, when the axle is at the stop limit corresponding to the lowered limit of the frame, whereby raising of the front end of the equipment is prevented.

References Cited in the file of this patent
UNITED STATES PATENTS

| | | |
|---|---|---|
| 428,249 | Harfield | May 20, 1889 |
| 1,604,338 | Caughey | Oct. 26, 1926 |
| 2,213,401 | Lindgren et al. | Sept. 3, 1940 |
| 2,239,596 | Doane | Apr. 22, 1941 |
| 2,320,742 | Newkirk | June 1, 1943 |
| 2,344,757 | Weisberger | Mar. 21, 1944 |
| 2,410,918 | Acton | Nov. 12, 1946 |
| 2,426,548 | Capon et al. | Aug. 26, 1947 |
| 2,573,969 | Heitzig | Nov. 6, 1951 |
| 2,625,090 | Pursche | Jan. 13, 1953 |
| 2,625,091 | Pursche | Jan. 13, 1953 |
| 2,669,920 | Da Valle | Feb. 23, 1954 |
| 2,684,021 | Ratzlaff | July 20, 1954 |
| 2,691,930 | Forgy | Oct. 19, 1954 |

FOREIGN PATENTS

| | | |
|---|---|---|
| 336,801 | Great Britain | Oct. 23, 1930 |
| 608,130 | Great Britain | Sept. 10, 1948 |